United States Patent
McGuffin

(10) Patent No.: US 11,451,290 B2
(45) Date of Patent: Sep. 20, 2022

(54) COMMUNICATION MANAGEMENT UNIT WITH CONFIGURABLE INTERFACE

(71) Applicant: Honeywell International Inc., Morris Plains, NJ (US)

(72) Inventor: Thomas F. McGuffin, Bellevue, WA (US)

(73) Assignee: Honeywell International Inc., Charlotte, NC (US)

( * ) Notice: Subject to any disclaimer, the term of this patent is extended or adjusted under 35 U.S.C. 154(b) by 496 days.

(21) Appl. No.: 16/116,359

(22) Filed: Aug. 29, 2018

(65) Prior Publication Data

US 2020/0076496 A1   Mar. 5, 2020

(51) Int. Cl.
*H04W 92/00* (2009.01)
*H04B 7/185* (2006.01)
(Continued)

(52) U.S. Cl.
CPC ....... *H04B 7/18508* (2013.01); *G08G 5/0013* (2013.01); *H04L 41/0806* (2013.01); *H04L 41/0813* (2013.01)

(58) Field of Classification Search
CPC . H04L 2209/84; H04L 41/0806; H04L 41/12; H04L 12/28; H04L 12/64;
(Continued)

(56) References Cited

U.S. PATENT DOCUMENTS 6,353,779 B1   3/2002   Simon et al.
8,103,271 B2   1/2012   Calderhead et al.
(Continued)

FOREIGN PATENT DOCUMENTS

EP   2023685 A1   2/2009
EP   2544383 A1   1/2013
(Continued)

OTHER PUBLICATIONS

European Patent Office, "Extended European Search Report from EP Application No. 19192717.7", from Foreign Counterpart to U.S. Appl. No. 16/116,359, dated Nov. 11, 2019, pp. 1-10, Published: EP.
(Continued)

*Primary Examiner* — Tu X Nguyen
(74) *Attorney, Agent, or Firm* — Fogg & Powers LLC

(57) ABSTRACT

A vehicle communication management unit is provided that includes at least one configurable communication interface, at least one memory and a communication controller. Each configuration communication interface is configured to interface signals between a communication link and the vehicle communication management unit using a select communication protocol. The memory is used to store operating instructions of the communication management unit including an interface configuration table. The interface configuration table includes communication operating parameters for select communication protocols. The communication controller is used to control communication operations of the communication management unit. The communication controller is configured to determine a type of communication protocol used in a communication link coupled to the at least one configurable communication interface. The communication controller is further configured to configure the at least one configurable communication interface with communication operating parameters stored in the configuration table associated with the determined type of communication protocol.

20 Claims, 4 Drawing Sheets

(51) Int. Cl.
*G08G 5/00* (2006.01)
*H04L 41/0806* (2022.01)
*H04L 41/0813* (2022.01)

(58) Field of Classification Search
CPC .......... H04L 12/46; H04L 67/00; H04L 5/14;
H04W 76/10; H04W 72/0413; H04W
76/14; H04W 84/12; H04W 88/06; H04W
48/18; H04W 76/15; H04W 92/00; H04J
11/0069; H04J 1/00; H04Q 9/00
USPC ...................................................... 455/569.2
See application file for complete search history.

(56) References Cited

U.S. PATENT DOCUMENTS

| | | | |
|---|---|---|---|
| 8,284,674 B2 | 10/2012 | True et al. | |
| 8,416,732 B2 | 4/2013 | Bothorel | |
| 8,578,037 B2 | 11/2013 | Nelson et al. | |
| 9,038,160 B2 | 5/2015 | Kauffman et al. | |
| 9,471,295 B2 * | 10/2016 | Baraldi | G06F 8/61 |
| 2005/0026609 A1 | 2/2005 | Brinkley et al. | |
| 2009/0258643 A1 | 10/2009 | McGuffin | |
| 2010/0042272 A1 | 2/2010 | Gruyer et al. | |
| 2011/0255506 A1 | 10/2011 | Toth et al. | |
| 2012/0295537 A1 | 11/2012 | Zaruba et al. | |
| 2015/0222351 A1 | 8/2015 | Judd et al. | |
| 2018/0350245 A1 * | 12/2018 | Priest | G08G 5/0039 |
| 2018/0376301 A1 * | 12/2018 | Park | H04W 4/90 |

FOREIGN PATENT DOCUMENTS

| | | |
|---|---|---|
| EP | 2903180 A1 | 8/2015 |
| WO | 2004008277 A2 | 1/2004 |

OTHER PUBLICATIONS

European Patent Office, "Communication pursuant to Article 94(3) EPC from EP Application No. 19192717.7", from Foreign Counterpart to U.S. Appl. No. 16/116,359, filed Jul. 3, 2020, pp. 1 through 7, Published: EP.

European Patent Office, "Communication pursuant to Article 94(3) EPC from EP Application No. 19192717.7", from Foreign Counterpart to U.S. Appl. No. 16/116,359, filed Dec. 8, 2020, pp. 1 through 9, Published: EP.

* cited by examiner

COMMUNICATION MANAGEMENT UNIT WITH CONFIGURABLE INTERFACE

BACKGROUND

Communication management units (CMUs)/ communication management functions (CMFs) enable communications between air-ground communication systems and aircraft systems. CMU/CMF communication interfaces are used to interface communication system protocols between communication systems and the CMU/CMF. Example interfaces currently used include satellite data unit SDU interfaces that interface satellite based communication systems with the CMU and high frequency data radio (HFDR) interfaces. Different types of communication systems are being developed and implemented for vehicle communication. For example, more types of SDUs are appearing on the market such as row44, gogo, etc. To accommodate other types of communications, the software of the CMU needs to be modified each time a new type of communication interface is needed.

SUMMARY

The following summary is made by way of example and not by way of limitation. It is merely provided to aid the reader in understanding some of the aspects of the subject matter described. Embodiments provide a CMU with configurable communication interfaces.

In one embodiment, a vehicle communication management unit is provided. The vehicle communication management unit includes, at least one configurable communication interface, at least one memory and a communication controller. Each configuration communication interface is configured to interface signals between a communication link and the vehicle communication management unit using a select communication protocol. The at least one memory is used to store operating instructions of the communication management unit including an interface configuration table. The interface configuration table includes communication operating parameters for select communication protocols. The communication controller is used to control communication operations of the communication management unit. The communication controller is configured to determine a type of communication protocol used in a communication link coupled to the at least one configurable communication interface. The communication controller is further configured to configure the at least one configurable communication interface with communication operating parameters stored in the configuration table associated with the determined type of communication protocol.

In another example embodiment, a communication system is provided. The communication system including at least one memory, a plurality of communication links and a communication management unit. The at least one memory is used to store an interface configuration table. The interface configuration table includes communication operating parameters for select communication protocols. The communication management unit includes a plurality of configurable communication interfaces. Each configurable communication interface is configured to interface signals between an associated communication link of the plurality of communication links and the communication management unit using a select communication protocol. The communication controller is used to control communication operations of the communication management unit. The communication controller is configured to determine a type of communication protocol used in a communication link coupled to the at least one configurable communication interface. The communication controller is further configured to configure each configurable communication interface with communication operating parameters stored in the configuration table associated with the determined type of communication protocol.

In yet another embodiment, a method of operating a vehicle communication management unit with a plurality of configurable communication interfaces is provided. The method includes identifying a communication type associated with a message; retrieving configuration information associated with the communication type from a configuration interface table; configuring a configurable communication interface of the plurality of configurable communication interfaces based on the retrieved configuration information; and interfacing communications through the configurable communication interface.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a communication management unit (CMU) with configurable communication interfaces. These generic interfaces can accommodate future communication systems. Benefits of embodiments provide a system that only requires the software of the CMU be modified once instead of each time a new communication type is added.

Figure 1:
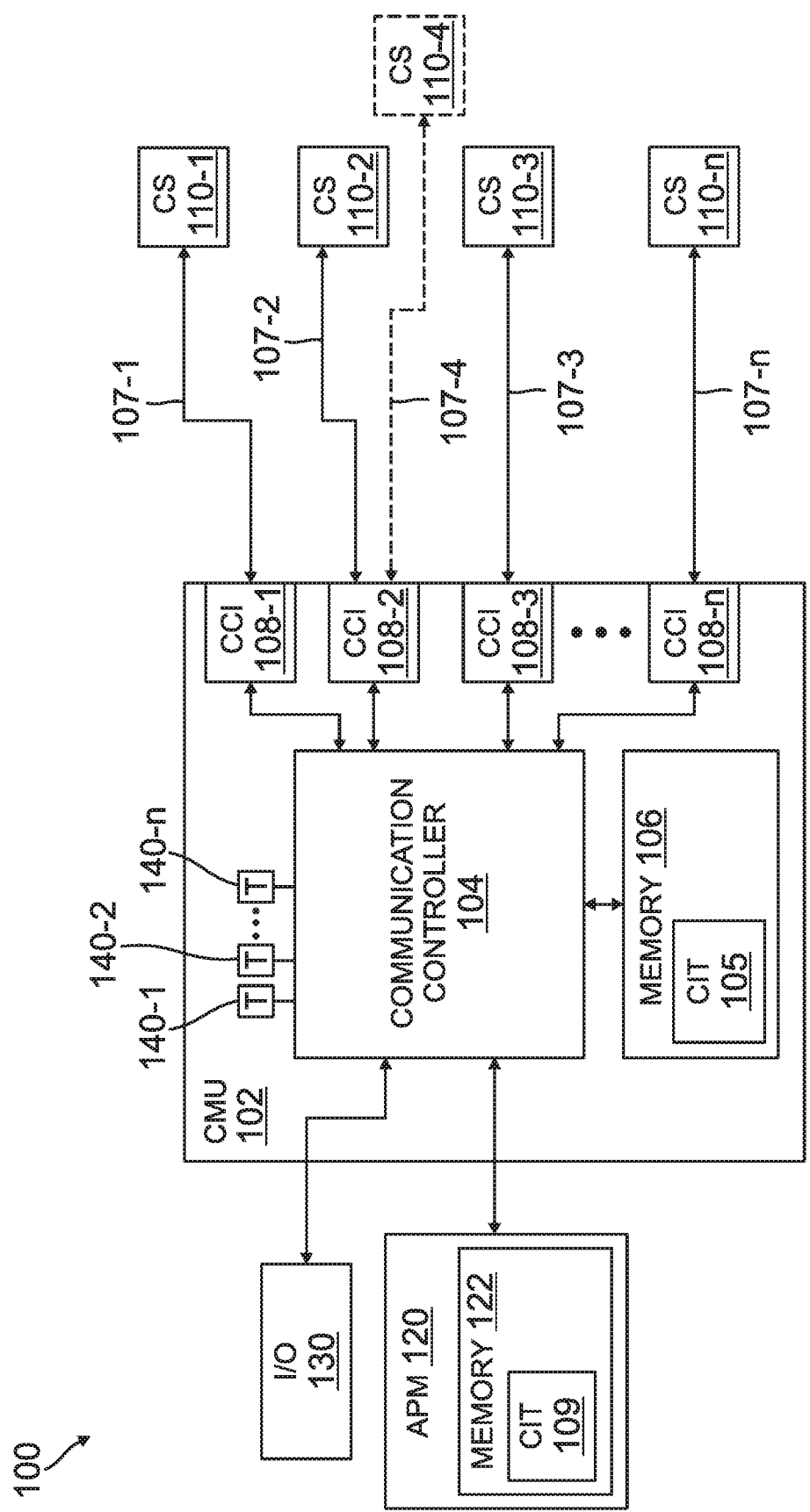
FIG. 1 illustrates a block diagram of communication system with a CMU according to one exemplary embodiment.

FIG. 1 illustrates a block diagram of communication system 100 with a CMU 102 in one example embodiment. The CMU 102 includes a communication controller 104 that is in communication with a memory 106. In general, the communication controller 104 (processor) may include any one or more of a microprocessor, a digital signal processor (DSP), an application specific integrated circuit (ASIC), a field program gate array (FPGA), or equivalent discrete or integrated logic circuitry. In some example embodiments, communication controller 104 may include multiple components, such as any combination of one or more microprocessors, one or more controllers, one or more DSPs, one or more ASICs, one or more FPGAs, as well as other discrete or integrated logic circuitry. The functions attributed to communication controller 104 herein may be embodied as software, firmware, hardware or any combination thereof. Memory 106 may include computer-readable instructions that, when executed by communication controller 104 provide functions of the CMU 102. The computer readable instructions may be encoded within the memory 106. Memory 106 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Figure 2:
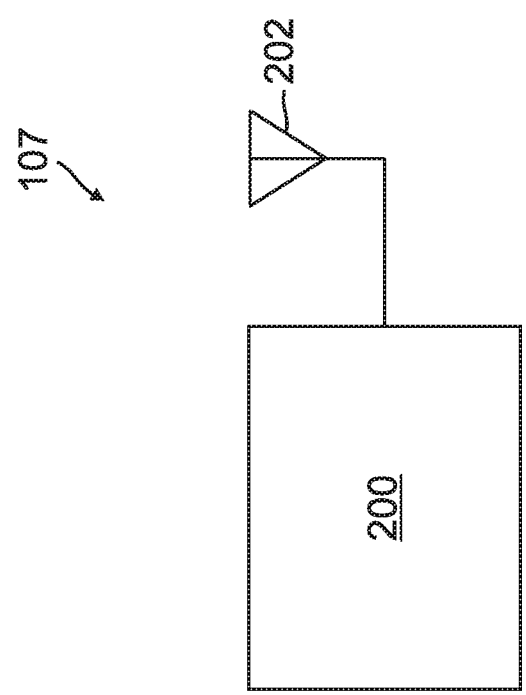
FIG. 2 illustrates a block diagram of a partial communication link according to one exemplary embodiment.

The CMU 102 further includes a plurality of generic configurable communication interfaces (CCI) 108-1 through 108-*n* that are in communication with the communication controller 104. The CCIs 108-1 through 108-*n* can generally be referenced as 108. Each CCI 108 provides an interface between a communication system, such as communication systems 110-1 through 110-*n,* and the CMU 102. Each CCI 108 is reconfigurable so that different types of the communication systems using different types of protocols can communicate with the CMU 102. The communication systems can be generally referenced by 110. A communication system 110 is in communication with a CCI 108 via an associated communication link (CL) 107-1 through 107-*n*. The communication links can be generally referenced as 107. The communication links 107 include devices needed to establish communications between the CS 110 and respective CCI 108. An example of a portion of a communication link 107 associated with the aircraft is illustrated in FIG. 2. This portion of the communication link 107 include a transceiver 200 to send and receive signals and an antenna 202.

Memory 106 in an embodiment includes a communication interface table (CIT) 105 that includes communication protocols used with different types of communication systems. In embodiments, the communication controller 104 configures the CCI 108 based on the communication protocols stored in the memory 106. As discussed above, the memory 106 may also store operational instructions for the communication controller 104.

In an embodiment, a CIT is stored external to the CMU 102. For example, FIG. 1 illustrates an aircraft personality module (APM) 120 that is external to the CMU 102. The APM 120 includes a memory 122 that stores a CIT 109. The communication controller 104 is in communication with the APM to access CIT 109 in this example embodiment. Further illustrated in FIG. 1 is an input/output 130 that provides a communication link between other aircraft systems. An example of other aircraft systems include a multifunctional display.

An example of different types of communication systems 110 include satellite based systems, cellular, Wi-Fi, aeronautical mobile airport communication system (AeroMACS) etc. Satellite based systems are typically interfaced by satellite data unit (SDU) interfaces while other types of communication signals are interfaced by high frequency data radio (HFDR) interfaces. Present aircraft CMUs assume that communications via SDU interfaces are approved for "safety" or air traffic control (ATC)/air traffic services (ATS) messages such aeronautical radio, incorporated (ARINC) 623 messages and future air navigation system (FANS)1/A messages. However, more types of SDUs are appearing on the market (e.g. row44, gogo for example) that are not approved for "safety" or ATC/ATS messages because the physics of the RF frequency(s) is not reliable enough for "safety" or ATC/ATS messages (i.e. critical data). Some embodiments not only configure the CCI 108 as needed, the use of "safety" or air traffic control (ATC)/air traffic services (ATS) messages through respective CCI 110 are also determined as discussed below. Embodiments, further allow for the reconfiguring of a CCI 108 to allow for different types of communication systems to be in communication with an associated CCI 108. For example, CS 110-2 that is communication with CCI 108-2 via communication link 107-2 may be replaced with CS 110-4 via coupling link 107-4.

Current CMUs have 4 SDU interfaces. In an embodiment, CMU software allows each CCI 108 to be configured to allow or not allow "safety" or ATC/ATS messages. Further in an embodiment the CMU software is designed so that each CCI 108 is configured to either operate independently or in a master/backup relationship with another CCI 108. This type of arrangement may also be done with the CCI interface configured to act as HFDR interfaces. Aircraft communication addressing and reporting system (ACARS) protocol timers 140-1 through 140-*n* may be configurable to maximize the throughput of each air/ground subnetwork based on the properties of the air/ground subnetwork. The protocol timers may be generally referenced as 140.

Figure 3:
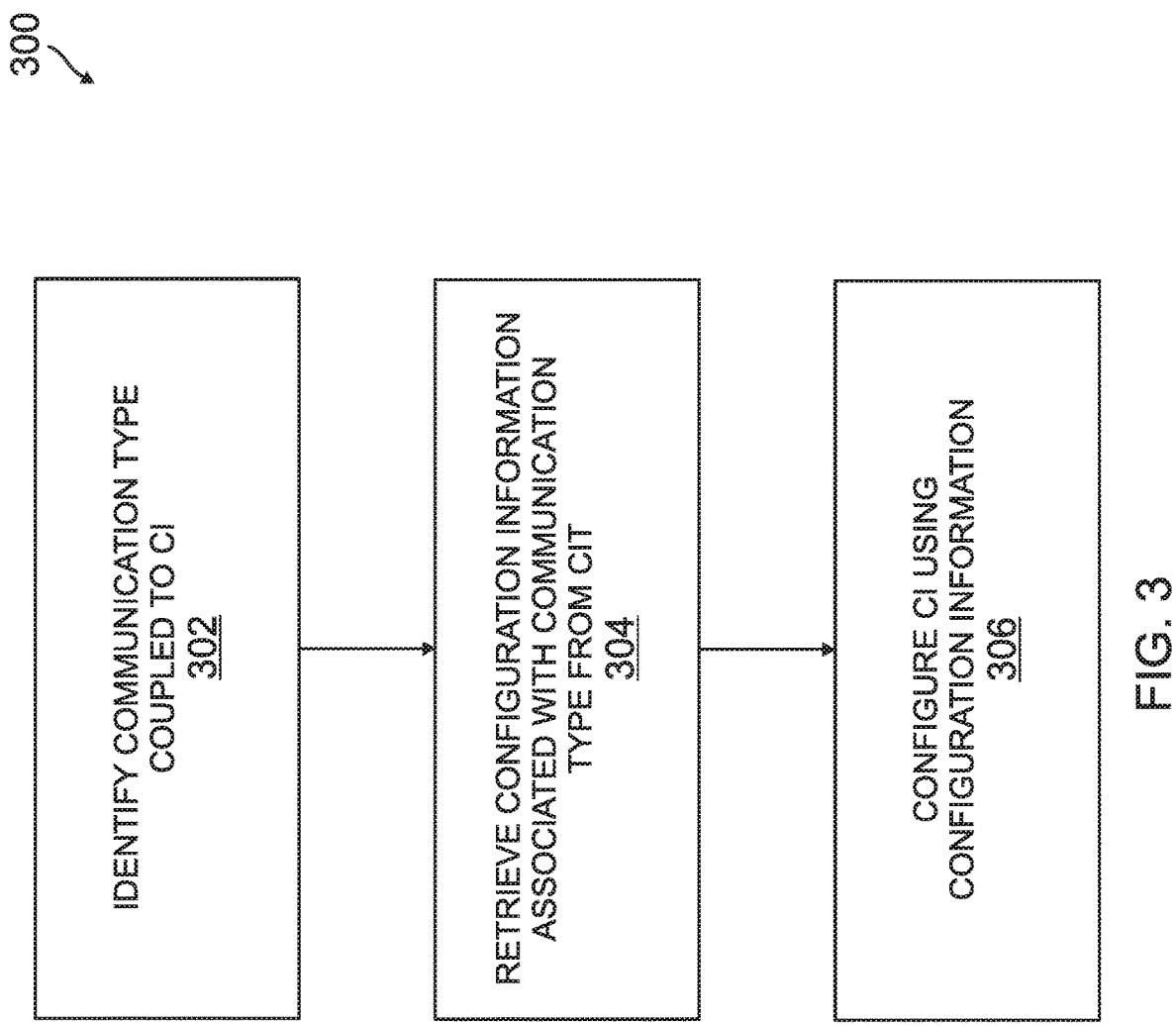
FIG. 3 illustrates a configuration flow diagram according to one exemplary embodiment.

Referring to FIG. 3, a configuration flow diagram 300 of an example embodiment is illustrated. The configuration flow diagram 300 is provided as a series of sequential steps. The steps in other embodiments may occur in a different sequence. Hence, embodiments are not limited in the sequence of steps. In the example of FIG. 2, the communication type that is coupled to the CCI 108 is identified at step (302). This can be done a number of ways. For example, the communication type may be manually entered through the I/O 130 (human machine interface). In another example, the communication type is automatically identified by either identifying the protocol being used in communicated messages, reading a communication type identifier in a communication signal, etc.

Once the communication type has been identified, configuration information regarding the communication type is retrieved from the CIT 105 or 109 at step (304). As discussed above, the CIT 105 or 109 contains configuration information including protocols that are used to configure the associated CCI 108. The associated CCI 108 is then configured according to the configuration information retrieved from the CIT 105 or 109 at step (306). In one embodiment, the each CCI 108 is configured on power up the CMU 102.

Configuration information may be entered in the CIT 105 and 109 via file transfer or configuration messages. Also in an embodiment, configuration information can be retrieved from the CMU 102 via file transfer, serial interface, ACARS message, etc. Further in an embodiment, the current configuration of each CCI 108 is provided to the I/O 130 where in can be displayed via display, such as a multifunctional display or other display.

Figure 4:
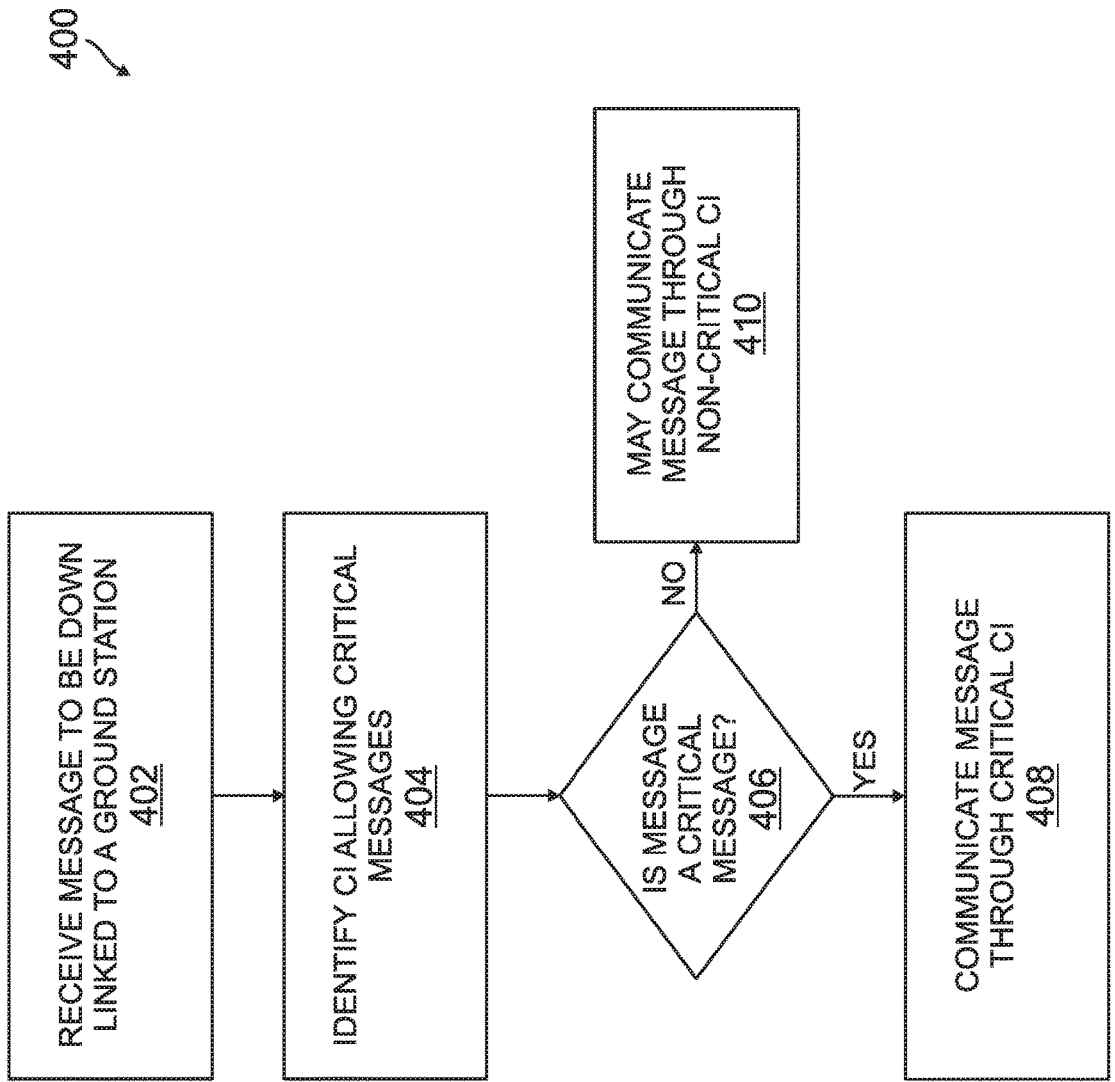
FIG. 4 illustrates a message evaluation flow diagram according to one exemplary embodiment.

As discussed above, the configuration information or other identifiable information associated with each CCI 108 may indicate the CCI 108 is in a master/backup relationship and whether the CCI 108 is allowed to communicate "safety" or ATC/ATS messages. "Safety" or ATC/ATS messages are critical messages that require communications through a reliable commutation system. The message evaluation flow diagram 400 of FIG. 4, provides an example of a system that uses select CCIs 108 based on the type of message to be communicated. The message evaluation flow diagram 400 is provided as a series of sequential steps. The steps, however, may be in a different order in other embodiments. Hence, embodiments are not limited to sequence of order illustrated in FIG. 4.

In the example message evaluation flow diagram 400, the process starts when the CMU 102 receives a message to be down link to a ground station at step (402). The communication controller 104 then identifies if the message is a critical message at step (404). A message is critical it is a "safety" message or ATC/ATC message. In one embodiment, this is done by determining the type of message to be sent and/or who is to receive message. If it is determined the message is critical at step (406), the communication controller 104 uses one of the CCIs 108 indicated as allowing critical messages to interface the messages to an appropriate communication link 107. If it is determined the message is not critical at step (406), the communication controller 104 may use one of the CCIs 108 that are indicated as not allowing critical messages to interface the messages to an appropriate communication link 107.

Embodiments provide a flexible and configurable system. An example of the flexibility is described hereafter with CCIs 108. In this example, CCI 108-1 may be configured for Inmarsat swift broadband and allow safety measures and optimize ACARS timers 140 (e.g. set retry timer 104-1 to 30 second). CCI 108-2 may be configured for Inmarsat classic and allow safety measures and optimize ACARS timers 140-2 (e.g. set retry timer to 150 seconds). CCI 108-3 may be configured for Row 44 and not allow safety measures and optimize ACARS timers 140-*n* (e.g. set retry timer to 90 seconds). While CCI 108-4 could be configured for Wi Fi and not allow safety measures and optimize ACARS timers 140-*n* (e.g. set retry timer to 10 seconds, etc.) This configuration info would be stored in the non-volatile memory of 106 or 122 in the CCIT 105 and 109.

EXAMPLE EMBODIMENTS

Example 1 is a vehicle communication management unit. The vehicle communication management unit includes, at least one configurable communication interface, at least one memory and a communication controller. Each configuration communication interface is configured to interface signals between a communication link and the vehicle communication management unit using a select communication protocol. The at least one memory is used to store operating instructions of the communication management unit including an interface configuration table. The interface configuration table includes communication operating parameters for select communication protocols. The communication controller is used to control communication operations of the communication management unit. The communication controller is configured to determine a type of communication protocol used in a communication link coupled to the at least one configurable communication interface. The communication controller is further configured to configure the at least one configurable communication interface with communication operating parameters stored in the configuration table associated with the determined type of communication protocol.

Example 2, includes the vehicle communication management unit of Example 1, wherein the communication operating parameters of select communication protocols allow for a communication of critical safety information signals.

Example 3 includes the vehicle communication management unit of any of the Examples 1-2, wherein the communication controller is further configured to set the at least one configurable communication interface into a master/backup relationship with another one of the at least one configurable communication interface of the communication management unit. Example 4 includes the vehicle communication management unit of any of the Examples 1-3, wherein the at least one configurable communication interface is a satellite data unit interface.

Example 5 includes the vehicle communication management unit of any of the Examples 1-4, wherein the communication controller is configured to configure the at least one configurable communication interface using the communication operating parameters stored in the configuration table associated upon startup of the vehicle communication management unit.

Example 6 includes the vehicle communication management unit of any of the Examples 1-5, further including at least one protocol timer used by the communication controller for select communication protocols.

Example 7 includes a communication system. The communication system including at least one memory, a plurality of communication links and a communication management unit. The at least one memory is used to store an interface configuration table. The interface configuration table includes communication operating parameters for select communication protocols. The communication management unit includes a plurality of configurable communication interfaces. Each configurable communication interface is configured to interface signals between an associated communication link of the plurality of communication links and the communication management unit using a select communication protocol. The communication controller is used to control communication operations of the communication management unit. The communication controller is configured to determine a type of communication protocol used in a communication link coupled to the at least one configurable communication interface. The communication controller is further configured to configure each configurable communication interface with communication operating parameters stored in the configuration table associated with the determined type of communication protocol.

Example 8 includes the communication system of Example 7, wherein the at least one memory is within the communication management unit.

Example 9 includes the communication system of any of the Examples 7-8, wherein the at least one memory is located external to the communication unit.

Example 10 includes the communication system of Example 9, further including an aircraft personality module. The at least one memory located within the aircraft personality module.

Example 11 includes the communication system of any of the Examples 7-10, further including a communication link for each configurable communication interface. Each communication link includes at least one transceiver and at least one antenna.

Example 12 includes the communication system of any of the Examples 7-11, further including an input/output in communication with the communication controller.

Example 13 includes the communication system of the Example 12, wherein the input/output includes a human machine interface.

Example 14 includes the communication system of any of the Examples 7-13, wherein the communication controller is further configured to set at least two of the configurable communication interfaces of the plurality of communication interfaces into a master/backup relationship with one another.

Example 15 includes the communication system of any of the Examples 7-14, wherein communication controller is further configured to identify which of the plurality of configurable communication interfaces are allowed to send and receive critical information and only using those identified communication interfaces to send and receive the critical information.

Example 16 includes a method of operating a vehicle communication management unit with a plurality of configurable communication interfaces. The method includes identifying a communication type associated with a message; retrieving configuration information associated with the communication type from a configuration interface table; configuring a configurable communication interface of the plurality of configurable communication interfaces based on the retrieved configuration information; and interfacing communications through the configurable communication interface.

Example 17 includes the method of Example 16 further including assigning master/backup relationship with at least one pair of the plurality of configurable communication interfaces.

Example 18 includes the method of any of the Examples 16-17, further including determining if a message to be communicated is a critical message; determining if the configuration of the configurable communication interface allows the interface of critical messages; and using the communication interface when it is has been determined that the message is a critical message and the configurable communication interface is allowed to interface critical messages.

Example 19 includes the method of Example 18, further including using a different configurable communication interface of the plurality of configurable communication interfaces when the it has been determined that the configurable communication interface has not been configured to interface critical messages.

Example 20 includes the method of any of the Examples 16-19, further including configuring configurable communication interfaces in communication with associated communication links upon power up of the vehicle communication management unit.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A vehicle communication management unit comprising:
    at least one configurable communication interface, each configuration communication interface configured to interface signals between a communication link and the vehicle communication management unit using a select communication protocol;
    at least one memory to store operating instructions of the communication management unit including an interface configuration table, the interface configuration table including communication operating parameters for select communication protocols; and
    a communication controller to control communication operations of the communication management unit, the communication controller configured to determine a type of communication protocol used in a communication link coupled to the at least one configurable communication interface, the communication controller further configured to configure the at least one configurable communication interface with communication operating parameters stored in the configuration table associated with the determined type of communication protocol, wherein the same at least one configurable interface is selectively configured to communicate using different communication protocols.

2. The vehicle communication management unit of claim 1, wherein communication operating parameters of select communication protocols allow for a communication of critical safety information signals.

3. The vehicle communication management unit of claim 1, wherein the communication controller is further configured to set the at least one configurable communication interface into a master/backup relationship with another one of the at least one configurable communication interface of the communication management unit.

4. The vehicle communication management unit of claim 1, wherein the at least one configurable communication interface is a satellite data unit interface.

5. The vehicle communication management unit of claim 1, wherein the communication controller is configured to configure the at least one configurable communication interface using the communication operating parameters stored in the configuration table associated upon startup of the vehicle communication management unit.

6. The vehicle communication management unit of claim 1, further comprising:
    at least one protocol timer used by the communication controller for select communication protocols.

7. A communication system comprising:
    at least one memory to store an interface configuration table, the interface configuration table including communication operating parameters for select communication protocols;
    a plurality of communication links; and
    a communication management unit including:
    a plurality of configuration communication interfaces, each configuration communication interface configured to interface signals between an associated communication link of the plurality of communication links and the communication management unit using a select communication protocol, and
    a communication controller to control communication operations of the communication management unit, the communication controller configured to determine a type of communication protocol used in a communication link coupled to the at least one configurable communication interface, the communication controller further configured to configure each configurable communication interface with communication operating parameters stored in the configuration table associated with the determined type of communication protocol, wherein the same at least one configurable interface is selectively configured to communicate using different communication protocols.

8. The communication system of claim 7, wherein the at least one memory is within the communication management unit.

9. The communication system of claim 7, wherein the at least one memory is located external to the communication unit.

10. The communication system of claim 9, further comprising:
an aircraft personality module, the at least one memory located within the aircraft personality module.

11. The communication system of claim 7, further comprising:
a communication link for each configuration communication interface, each communication link including at least one transceiver and at least one antenna.

12. The communication system of claim 7, further comprising:
an input/output in communication with the communication controller.

13. The communication system of claim 12, wherein the input/output includes a human machine interface.

14. The communication system of claim 7, wherein the communication controller is further configured to set at least two of the configuration communication interfaces of the plurality of configuration communication interfaces into a master/backup relationship with one another.

15. The communication system of claim 7, wherein communication controller is further configured to identify which of the plurality of configuration communication interfaces are allowed to send and receive critical information and only using those identified configuration communication interfaces to send and receive the critical information.

16. A method of operating a vehicle communication management unit with a plurality of configurable communication interfaces, the method comprising:
identifying a communication type associated with a message;
retrieving configuration information associated with the communication type from a configuration interface table;
configuring a configurable communication interface of the plurality of configurable communication interfaces based on the retrieved configuration information, wherein the configurable interface is a generic interface that is selectively configured to communicate using different communication protocols; and
interfacing communications through the configurable communication interface.

17. The method of claim 16, further comprising:
assigning master/backup relationship with at least one pair of the plurality of configurable communication interfaces.

18. The method of claim 16, further comprising:
determining if a message to be communicated is a critical message;
determining if the configuration of the configurable communication interface allows the interface of critical messages; and
using the communication interface when it is has been determined that the message is a critical message and the configuration communication interface is allowed to interface critical messages.

19. The method of claim 18, further comprising:
using a different configurable communication interface of the plurality of configurable communication interfaces when the it has been determined that the configurable communication interface has not been configured to interface critical messages.

20. The method of claim 16, further comprising:
configuring configurable communication interfaces in communication with associated communication links upon power up of the vehicle communication management unit.

* * * * *